United States Patent [19]

Yakou

[11] Patent Number: 5,161,847
[45] Date of Patent: Nov. 10, 1992

[54] ROBOT HAND

[75] Inventor: Takeshi Yakou, Tokyo, Japan

[73] Assignee: Canon Kabushiki Kaisha, Tokyo, Japan

[21] Appl. No.: 578,209

[22] Filed: Sep. 6, 1990

[30] Foreign Application Priority Data

Sep. 7, 1989 [JP] Japan .................................. 1-230413
Jul. 20, 1990 [JP] Japan .................................. 2-190829

[51] Int. Cl.$^5$ ........................... B25J 15/10; B66C 1/42
[52] U.S. Cl. .................. 294/119.1; 294/86.4; 294/907; 901/36; 901/39; 901/46
[58] Field of Search .................. 294/119.1, 61, 67.33, 294/81.54, 81.62, 86.4, 86.41, 93, 902, 907; 901/30, 31, 36–39, 46; 623/64

[56] References Cited

U.S. PATENT DOCUMENTS

| | | | |
|---|---|---|---|
| 4,332,038 | 6/1982 | Freeland | 623/64 |
| 4,453,873 | 6/1984 | Curti | 294/81.62 X |
| 4,482,289 | 11/1984 | Inaba et al. | 901/39 X |
| 4,652,204 | 3/1987 | Arnett | 901/31 X |
| 4,653,793 | 3/1987 | Guinot et al. | 294/119.1 X |
| 4,828,304 | 5/1989 | No et al. | 901/36 X |
| 4,921,293 | 5/1990 | Ruoff et al. | 901/36 X |
| 4,946,380 | 8/1990 | Lee | 623/64 X |
| 4,957,320 | 9/1990 | Ulrich | 901/39 X |
| 4,980,626 | 12/1990 | Hess et al. | 901/47 X |

FOREIGN PATENT DOCUMENTS

| | | | |
|---|---|---|---|
| 110559 | 8/1979 | Japan | 294/86.4 |
| 63-52934 | 3/1988 | Japan | |
| 63-207359 | 8/1988 | Japan | |

Primary Examiner—Margaret A. Focarino
Assistant Examiner—Dean J. Kramer
Attorney, Agent, or Firm—Fitzpatrick, Cella, Harper & Scinto

[57] ABSTRACT

An assembling hand according to the present invention includes a hand body, a first finger member capable of moving along the hand body, a rotational housing rotatably fastened to the hand body and a second and a third finger members capable of moving along the rotational housing in opposite directions to each other. A part holding operation is performed by the first, second and third finger members, with the rotational position of one part being restricted by the first finger member and the rotational position of another part being adjusted by the second and third finger members.

6 Claims, 14 Drawing Sheets

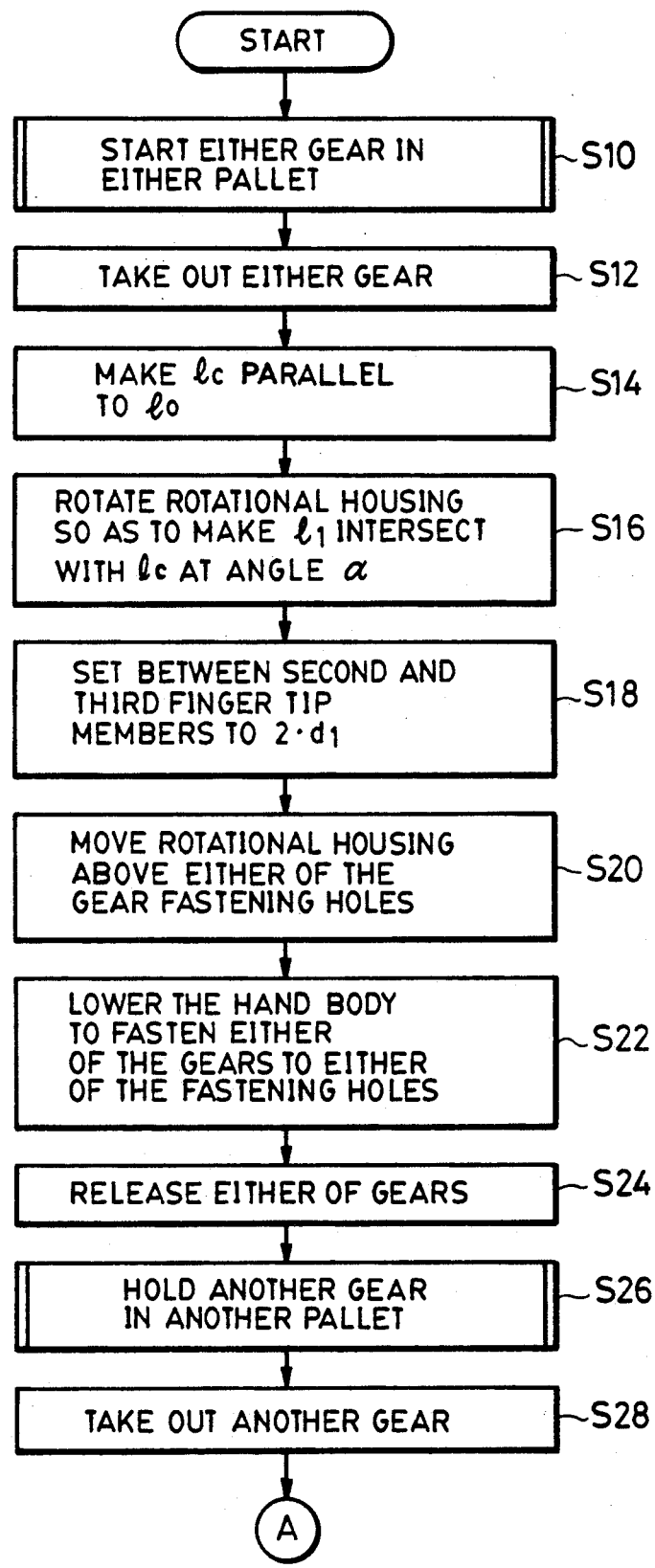

ROBOT HAND

BACKGROUND OF THE INVENTION

1. Field of the Invention

The present invention relates to a multi-purpose assembling hand capable of assembling parts having different shapes (for example a round part and a square part) and gears the threads of each of which are previously determined at the assembling operation.

2. Description of the Prior Art

Hitherto, an apparatus for holding parts (see Japanese Patent Application 63-207359 filed on Aug. 23, 1988) has been disclosed by the applicant of the present invention, with the apparatus for holding parts being capable of assembling different shaped parts (a round part and a square part or other combinations). Furthermore, a general-purpose gear assembling hand has been disclosed, as a structure capable of assembling the gears, by the applicant of the present invention in Japanese Patent Application No. 61-197,091 filed on Aug. 25, 1986.

However, according to the apparatus for holding parts disclosed in Japanese Patent Application No. 63-207359, the gears cannot be assembled to the subject member with the threads thereof engaged to one another. Furthermore, according to the general-purpose gear assembling hand disclosed in Japanese Application No. 61-1979091, parts having different shapes cannot be held and assembled to the subject member. In addition, since there has not been provided means for positioning the rotational position of the gears, the gears arranged in such a manner that a combination of the threads as previously determined cannot be assembled.

SUMMARY OF THE INVENTION

Accordingly, an object of the present invention is to provide an assembling hand capable of holding and assembling parts having different shapes from each other and also capable of assembling gears having a combination of threads which are to be engaged to one another previously determined.

Another object of the present invention is to provide a robot hand and a holding method capable of securely holding a workpiece of an optional shape having an inclined surface and an angle member.

Another object of the present invention is to provide a robot hand and a holding method capable of securely holding a workpiece having a complicated shape such as an L-shape in addition to a simple-shaped workpiece such as a flat plate or a rectangular body.

Another object of the present invention is to provide a robot hand and a holding method capable of securely holding a workpiece by realizing the most suitable configuration of three finger members so as to correspond to the shape of the workpiece to be held.

In order to overcome the above-described problems and to achieve the above-described objects, an assembling hand according to the present invention comprises a hand body, a first finger member capable of moving along the hand body, a rotational housing rotatably fastened to the hand body and second and third finger members capable of moving along the rotational housing in opposite directions to each other, wherein part holding operation is performed by the three finger members, and the rotational position of either of the parts is restricted by the first finger member and the rotational position of the other part is adjusted by the second and the third finger members.

In order to overcome the above-described problem and achieve the above-described objects, an aspect of the present invention lies in a robot hand for holding a workpiece, comprising a hand body, a first finger member fastened to the hand body and capable of moving on a first movement locus, first drive means for moving the first finger member along the first movement locus, second and third finger members fastened to the hand body and capable of moving along a second movement locus, second drive means for moving the first and the second finger members along the second movement locus so as to make them come closer or farther from each other and angle changing means for changing the angle made by the first and the second movement loci.

Another aspect of the present invention lies in a robot hand comprising identifying means for identifying the shape of a workpiece, storage means for storing information about the angle made by the first and the second movement loci and control means for reading angle information from the storage means in accordance with the shape information supplied from the identifying means so as to control the angle changing means in accordance with the read angle information.

Another aspect of the present invention lies in a robot hand further comprising identifying means for identifying the shape of the workpiece and control means for controlling the quantity of operation of the first and the second drive means.

Another aspect of the present invention lies in a robot hand for holding a workpiece according to the present invention and comprises three finger members, drive means for changing the relative distances between the three finger members and a pin member which can be projected over each of the finger members.

Another aspect of the present invention lies in a method of holding a workpiece by a robot hand comprising the steps of moving a first finger member of three finger members along a first movement locus; moving second and the third finger members along a second movement locus so as to adjust the distance between the second and the third finger members; and changing the angle made by the first and the second movement loci so that the workpiece is held by changing the distance between the first finger member and the second and the third finger members.

Another aspect of the present invention lies in a method of holding a workpiece by a robot hand comprising the step of projecting a pin member from each of the corresponding finger members so as to bring each of the pin members into contact with the outer surface of the workpiece to be held; and changing the relative distances between the three finger members, whereby the workpiece is held by changing the distance between the first finger member and the second and the third finger members.

According to the robot hand according to the present invention, the first finger member of the three finger members moves on a first predetermined movement locus and the second and the third finger members move on a second movement locus which makes a predetermined angle with the first movement locus, whereby the workpiece is held by changing the relative distances between the three finger members.

With a robot hand of such a configuration, it can easily hold a block member in the form of a rectangular parallelpipe or a cube.

The robot hand according to the present invention has a function of changing the angle made by the first movement locus and the second movement locus. Thus, even if the confronting surfaces constituting the side surfaces of a block are not parallel to each other, the robot hand according to the present invention can easily hold the block of the type described above.

According to the robot hand according to the present invention, the first finger member of the three finger members is moved along the first movement locus, and the second and the third finger members are moved along a second movement locus to bring them closer to or farther from each other. Furthermore, the pin members are projected over the finger members. Therefore, the relative distances between the three finger members and the length of projection of each of the finger members can be adjusted. As a result, the robot hand according to the present invention can hold a workpiece having an inclined surface or an angled portion.

According to the robot hand according to the present invention, the distance between the three finger members, the angle made by the first and the second movement loci and the length of the projection of the pin member of each of the finger members are defined so as to be stored in the storage means thereof. Furthermore, when a workpiece to be held is conveyed, the shape of the workpiece is identified by the identifying means and the corresponding shape information is read from the storage means for the purpose of properly controlling the corresponding drive means so that the workpiece is securely held.

Other and further objects, features and advantages of the invention will be appear more fully from the following description.

DESCRIPTION OF THE PREFERRED EMBODIMENTS

The structure of an embodiment of an assembling hand according to the present invention will now be described with reference to the drawings.

Figure 1:
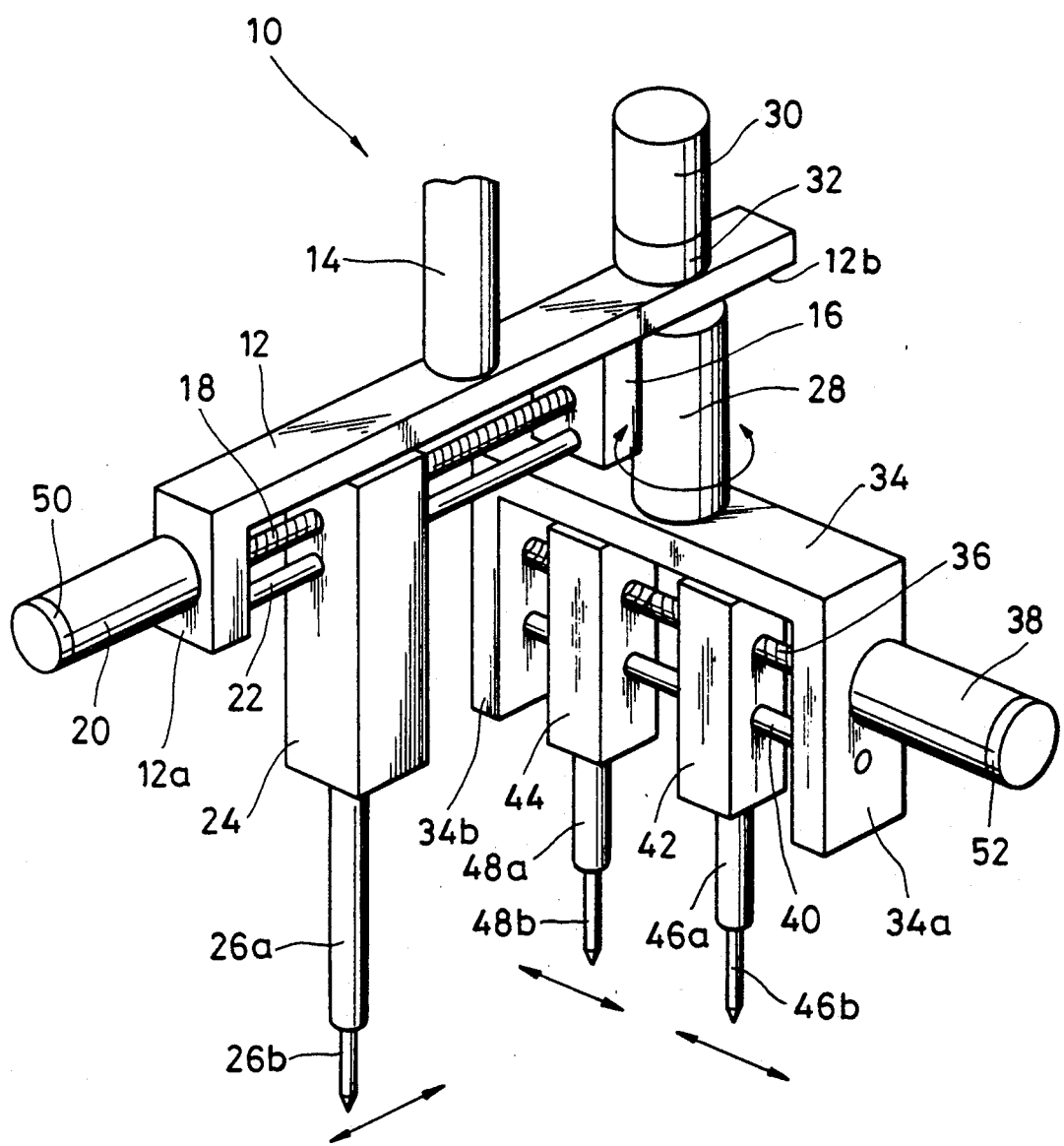
FIG. 1 is a perspective view which illustrates the structure of an embodiment of an assembling hand according to the present invention.

FIG. 1 illustrates an assembling hand 10 according to the present invention. The assembling hand 10 comprises a substantially L-shaped hand body 12 when viewed from the front portion, with the hand body 12 having a bent member 12a having an end portion bent downwards. The hand body 12 is detachably connected to the front portion of a robot arm (omitted from illustration) via a connecting rod 14 at the central portion of the top surface thereof. A supporting block 16 is secured to the lower surface of the hand body 12 at an inner portion from the other end portion 12b of the hand body opposite from the above-described bent member 12a.

A first feeding screw rod 18 having a thread on the outer surface thereof is disposed along the hand body 12, with the first feeding screw rod 18 being rotatably fastened around its central axis. The first feeding screw rod 18 is connected to the drive shaft of a first drive motor 20 fastened on the outer surface of the bent member 12a. As a result, when the first drive motor 20 is started, the first feeding screw 18 is rotated.

A first guide shaft 22 is secured between the supporting block 16 and the bent member 12a at a position below the first feeding screw rod 18 in such a manner that the first guide shaft 22 runs parallel to the first feeding screw rod 18. A first movable block 24 is disposed between the supporting block 16 and the bent member 12a in such a manner that the first movable block 24 is engaged to the first feeding screw rod 18 and capable of reciprocating along the first guide shaft 22. As a result, the first movable block 24 can be reciprocated along the hand body 12 and below the same in accordance with the rotation of the first drive motor 20.

A first finger member 26a is integrally fastened to the lower surface of the first movable block 24 in such a manner that the first finger member 26a projects downwardly from a lower surface of the first movable block 24. Furthermore, a first fingertip member 26b, having a diameter smaller than that of the first finger member 26a, is integrally fastened to a lower surface of the first finger member 26a in such a manner that the first fingertip member 26b projects further downwardly from the lower surface of the finger member 26a and coaxially therewith. A tapered surface is formed at the front end portion of the first fingertip member 26b so that the first fingertip member 26b has a sharp front end portion.

A rotational shaft 28, which can be rotated around its vertical axis, is fastened to the lower surface of the hand body 12 at the end portion 12b of the hand body 12. The top end portion of the rotational shaft 28 passes through the hand body 12 so as to be connected to an output shaft of a reduction mechanism 32 connected to a second drive motor 30 mounted on the top surface of the hand body 12. The lower end portion of the rotational shaft 28 is integrally connected to the central portion of the top surface of a rotational housing 34 having a substantially U-shape configuration.

That is, the rotational housing 34 comprises bent members 34a and 34b bent downwards at the two end portions thereof. A second feeding screw rod 36 having a thread on the outer surface thereof is disposed between the two bent members 34a and 34b along the rotational housing 34 in such a manner that the second feeding screw rod 36 is able to rotate around its central axis. The thread formed on the second feeding screw rod 36 is laterally sectioned into two pieces at the central portion thereof so as to respectively have opposite thread directions. The second feeding screw rod 36 is connected to the drive shaft of a third drive motor 38 mounted on the outer surface of the bent member 34a so that it can be rotated when the rotation of the third drive motor 38 is started.

A second guide shaft 40 is secured between the two bent members 34a and 34b below the second feeding screw rod 36 in such a manner that the second guide shaft 40 runs parallel to the second feeding screw rod 36. A second movable block 42 is disposed between the two bent members 34a and 34b in such a manner that the second movable block 42 is engaged to either of the threads of the second feeding screw rod 36 and capable of reciprocating along the second guide shaft 40. A third movable block 44 is disposed in such a manner that the third movable block 44 is engaged to either of the threads of the second feeding screw rod 36 and capable of also reciprocating along the second guide shaft 40. As a result, the second and the third movable blocks 42 and 44 are reciprocated so as to come closer and farther from each other along and below the rotational housing 34 in accordance with the direction of rotation of the third drive motor 38.

Second and a third finger members 46a and 48a are respectively integrally fastened to the respective lower surfaces of the second and the third movable blocks 42 and 44 in such a manner that the second and the third finger members 46a and 48a project downwards from the lower surface of each of the second and the third movable blocks 42 and 44. Furthermore, second and a third fingertip members 46b and 48b, having a diameter smaller than that of the second and the third finger members 46a and 48a, are integrally fastened to the lower surfaces of the second and the third finger members 46a and 48a in such a manner that the second and the third fingertip members 46b and 48b project further downwardly from the lower surfaces of the second and the third finger members 46a and 48a and coaxially therewith. A tapered surface is formed at the front end portion of each of the second and the third fingertip members 46b and 48b so that each of the second and the third fingertip members 46b and 48b has a sharp front end portion.

Rotary encoders 50 and 52 are connected to the corresponding drive shafts of the first and third drive motors 20 and 38. As a result, the quantity of rotation of each of the first and third drive motors 20 and 38 can be accurately detected by the corresponding rotary encoders 50 and 52.

The operation of the assembling hand 10 described above works as follows.

Figure 2:
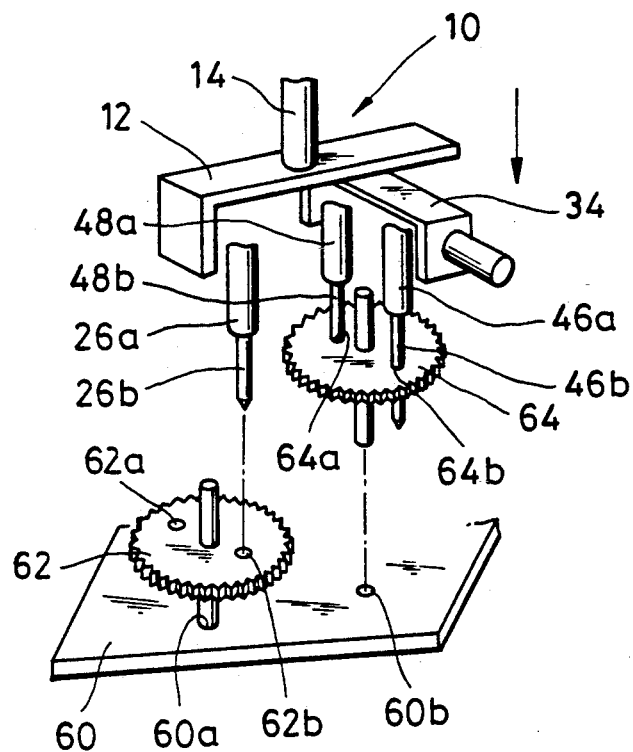
FIG. 2 is a perspective view which illustrates a state in which a pair of gears are fastened to a base plate by the assembling hand shown in FIG. 1 with a predetermined thread engagement maintained.

A process, in which a pair of gears 62 and 64 are, as shown in FIG. 2, fastened to a base plate 60 so as to establish a predetermined state of engagement of the gears 62 and 64, will be described.

Figure 3:
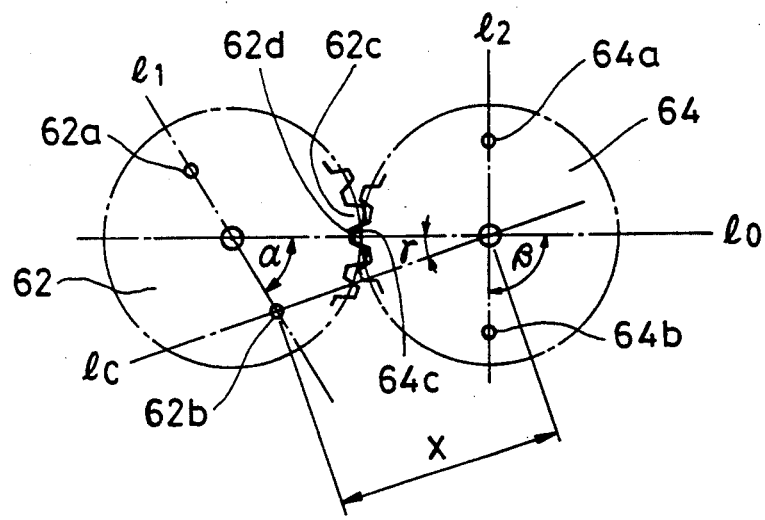
FIG. 3 is a top view which illustrates the predetermined thread engagement state shown in FIG. 2.

As shown in FIG. 3, the gears 62 and 64 have a corresponding pair of positioning holes 62a and 62b and another pair of positioning holes 64a and 64b at predetermined positions of radius $d_1$ and $d_2$ across the center thereof.

The above-described predetermined state of engagement is, as shown in FIG. 3, defined here in such a manner that the two gears 62 and 64 are engaged to each other, an angle made by segment $l_0$ which connects the centers of the two gears 62 and 64 and segment $l_1$ which connects the two positioning holes 62a and 62b of the gear 62 becomes $\alpha$ (when measured clockwise from the segment $l_0$) and an angle made by segment $l_0$ and segment $l_2$ which connects the two positioning holes 64a and 64b of the gear 64 becomes $\beta$ (when measured clockwise from the segment $l_0$ similarly to the angle $\alpha$). That is, the above-described state of engagement is determined by a state where a predetermined thread 64c of the gear 64 is fitted within a predetermined thread 62d of another gear 62.

As a result, the post-rotational position of each of the two gears is defined due to the thus realized state of engagement. That is, a predetermined triangular shape is formed in the above-described state of engagement by the three fingertip members 26b, 46b and 48b, respectively. Namely, the distance from the first fingertip member 26b to the rotational center of the gear 64 is defined by a value designated by symbol x, while the angle made by a segment connecting the first fingertip member 26b and the rotational center of the gear 64 and the segment $l_0$ which connects the rotational centers of the two gears 62 and 4 is defined by a value defined by symbol $\gamma$.

On the other hand, as shown in FIG. 2, the base plate 60 has gear fastening holes 60a and 60b into which the shaft portions of the corresponding gears 62 and 64 are inserted.

Figure 4B:
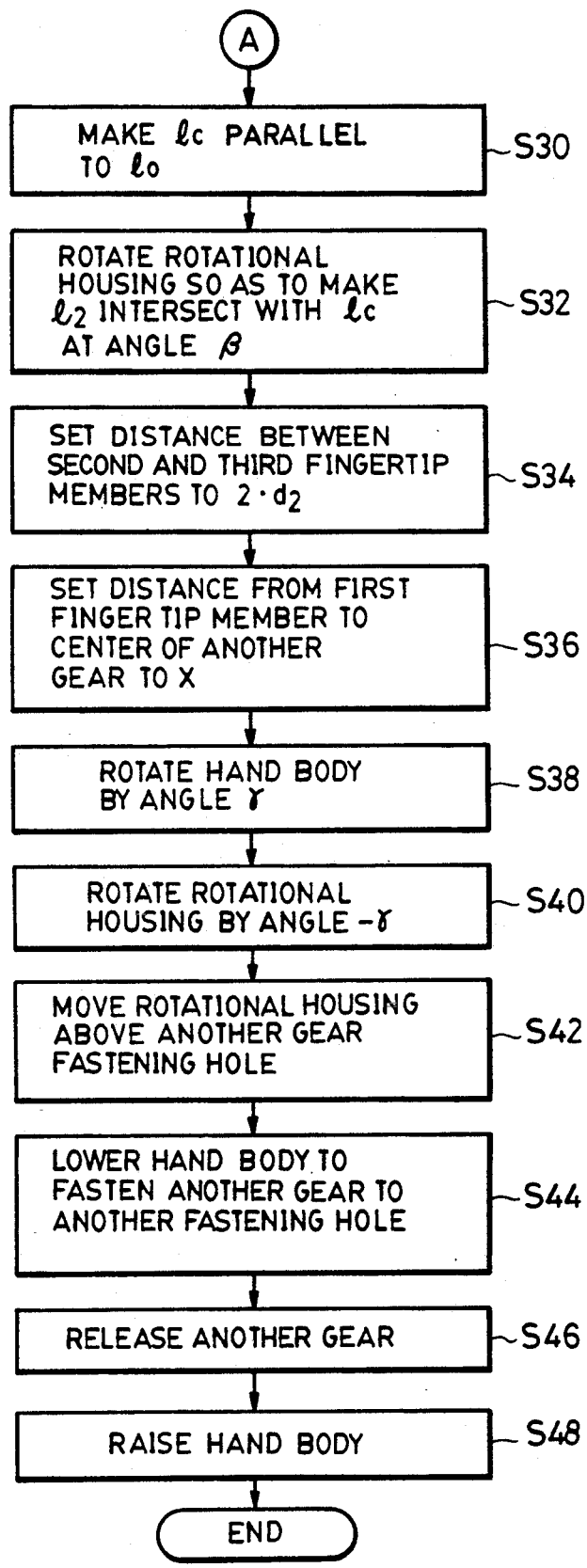
FIG. 4 (A and B) is a flow chart which illustrates the process for fastening the two gears to the base plate with the engagement of the two gears maintained.

An operation of fastening the pair of gears 62 and 64 to the base plate 62, with the state of engagement maintained, will be described with reference to a flow chart shown in FIG. 4.

First, in step S10, the gear 62 placed in a pallet (omitted from illustration) is held by a pair of the second and the third fingertip members 46b and 48b. After the gear 62 has been held as described above, the flow advances to step S12 in which the gear 62 is lifted out and in step S14, the lengthwise axis (the center line of the extension) lc of the hand body 12 is made to run parallel to the segment $l_0$ passing through the fastening holes 60a and 60b formed in the base plate 60.

In step S16, the second drive motor 30 is rotated so as to rotate the rotational housing 34 in such a manner that the segment $l_1$, passing through the pair of positioning holes 62a and 62b formed in the held gear 62, intersects with lengthwise axis $l_c$ at the angle $\alpha$ measured from the same in a clockwise direction. In step S18, the third drive motor 38 is rotated so that the distance between the second and the third fingertip members 46b and 48b is increased to a value which is two times the above-described radius d1.

With the geometrical positions of the second and the third fingertip members 46b and 48b having been defined, the center of the rotational housing 34 is moved to a position above the gear fastening hole 60a formed in the base plate 60 in step S20. In step S22, the hand body 12 is lowered so as to insert the gear 62 into the gear fastening hole 60a formed in the base plate 60. Thus, the process for fastening the gear 62 is completed.

In next step S24, the third drive motor 38 is rotated so that the gear 62 is released from the second and the third fingertip members 46b and 48b. In next step S26, the hand body 12 is moved so that the other gear 64 accommodated in another pallet (omitted from illustration) is held by the pair of fingertip members 46b and 48b. After the other gear 64 has been held as described above, the other gear 64 is lifted out from the other pallet in step S28. In the next step S30, the lengthwise axis (the center line of the extension) $l_c$ of the hand body 12 is made to run parallel to the segment $l_0$ passing through the gear fastening hole 60a formed in the base plate 60.

In step S32, the second drive motor 30 is then rotated so that the rotational housing 34 is rotated in such a manner that the segment $l_2$ passing through the pair of the positioning holes 64a and 64b formed in the other gear 64 intersects with the lengthwise axis $l_c$ at the angle $\beta$ when measured from the lengthwise axis $l_c$. Then, the third drive motor 38 is rotated in step S34 so that the distance between the second and the third fingertip members 46b and 48b is increased to a value which is two times the above-described radius $d_2$. Then, in step S36, the first drive motor 20 is rotated so that the first movable block 24, to which the first fingertip member 26b is fastened, is moved in such a manner that the distance from the first fingertip member 26b to the rotational center of the held second gear 64 becomes the above-described distance x.

Then, in step S38, the robot arm (omitted from illustration) is operated so that the hand body 12 is rotated around the center of the other gear 64 so as to make the above-described angle $\gamma$. Furthermore, in step S40, the second drive motor 30 is rotated so that the rotational housing 34 is rotated by the angle $\gamma$ in the reverse direction to the direction of rotation realized in step S38. The triangular shape, formed by the three fingertip members 26b, 46b and 48b, is allowed to completely coincide with a triangular shape formed by the second positioning hole 62b formed in the gear 62 and the two positioning holes 64a and 64b formed in the other gear 64, the triangular shape being formed when the two gears 62 and 64 are engaged to each other.

As described above, with the geometrical positions of the three fingertip members 26b, 46b and 48b defined, the center of the rotational housing 34 is, in step S42, moved to the position above the other gear fastening hole 60b formed in the base plate 60. Then in step S44, the hand body 12 is lowered so that the other gear 64 is inserted into the other gear fastening hole 60b formed in the base plate 60. Thus, the process for fastening the other gear 64 is completed.

In the above-described step S44, prior to the insertion of the shaft portion of the other gear 64 into the gear fastening hole 60b, the first fingertip member 26b is inserted into the second positioning hole 62b formed in the other gear 62 which has been previously fastened, the insertion of the first fingertip member 26b being performed in accordance with the above-described geometrical position.

If the position at which the gear 62 is fastened is deviated (that is, if the position at which the gear 62 is rotated is deviated), the predetermined thread 64c of the gear 64 is undesirably engaged to the thread 62c which is next to the correct thread 62d of the gear 62. Therefore, the engagement between the two gears becomes undesirable.

Figure 5:
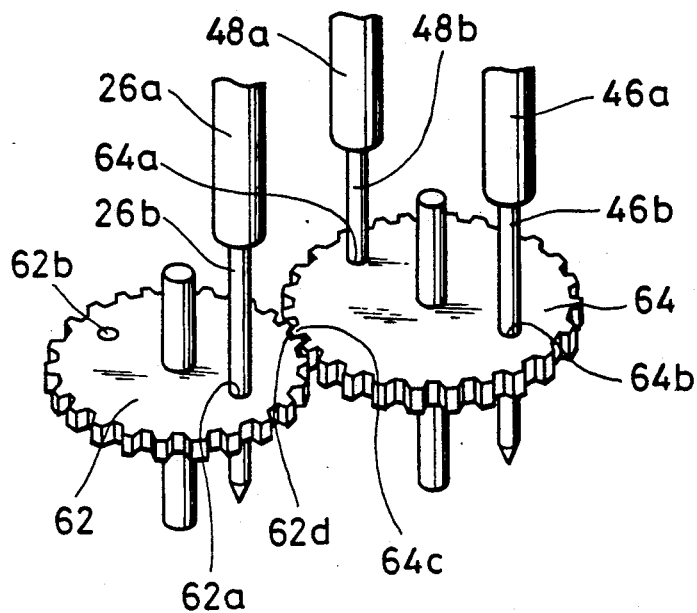
FIG. 5 is a perspective view which illustrates the state of the engagement of the thread of each of the two gears.

However, according to this embodiment, the tapered surface of the front portion of the first fingertip member 26b can be fitted into the edge of the second positioning hole 62. As a result, the position of the gear 62 at which it is rotated can be corrected by inserting the first fingertip member 26b into the second positioning hole 62b as shown in FIG. 5. Thus, the two gears 62 and 64 can be securely engaged to each other. That is, the thread 64c of the gear 64 is fitted downwardly into the predetermined thread 62d of the gear 62. 0 As described above, when the operation in step S44, in which the gear 64 is fastened to the base plate 60 and engaged with the corresponding gear 62, has been completed, the gear 64 is released from the second and the third fingertip members 46b and 48b in step S46. Then, in step S48, the hand body 12 is raised so that the assembling hand 10 is moved to a predetermined position. Thus, predetermined successive operation processes are completed.

Figure 6A:
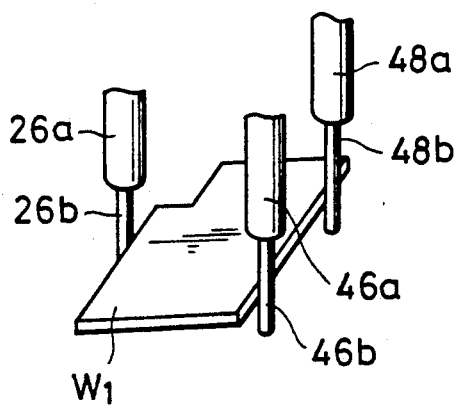
FIGS. 6A and 6B are perspective views which respectively illustrate states in which different shaped parts are held by the assembling hand shown in FIG. 1.
Figure 6B:
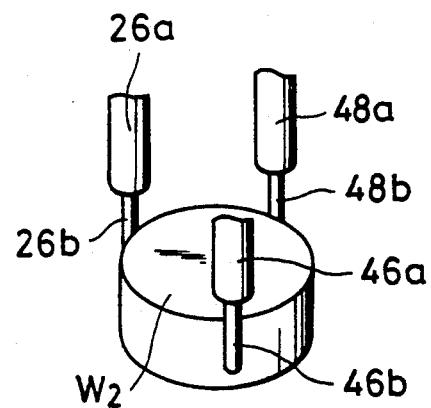

As described above, the pair of the gears 62 and 64, with the threads to be engaged to each other in a predetermined position, are assembled. In addition to the above-described operation for assembling the gears 62 and 64, the assembling hand 10 is able to hold a variety of workpieces such as members $W_1$ and $W_2$ (see FIGS. 6A and 6B).

Figure 7:
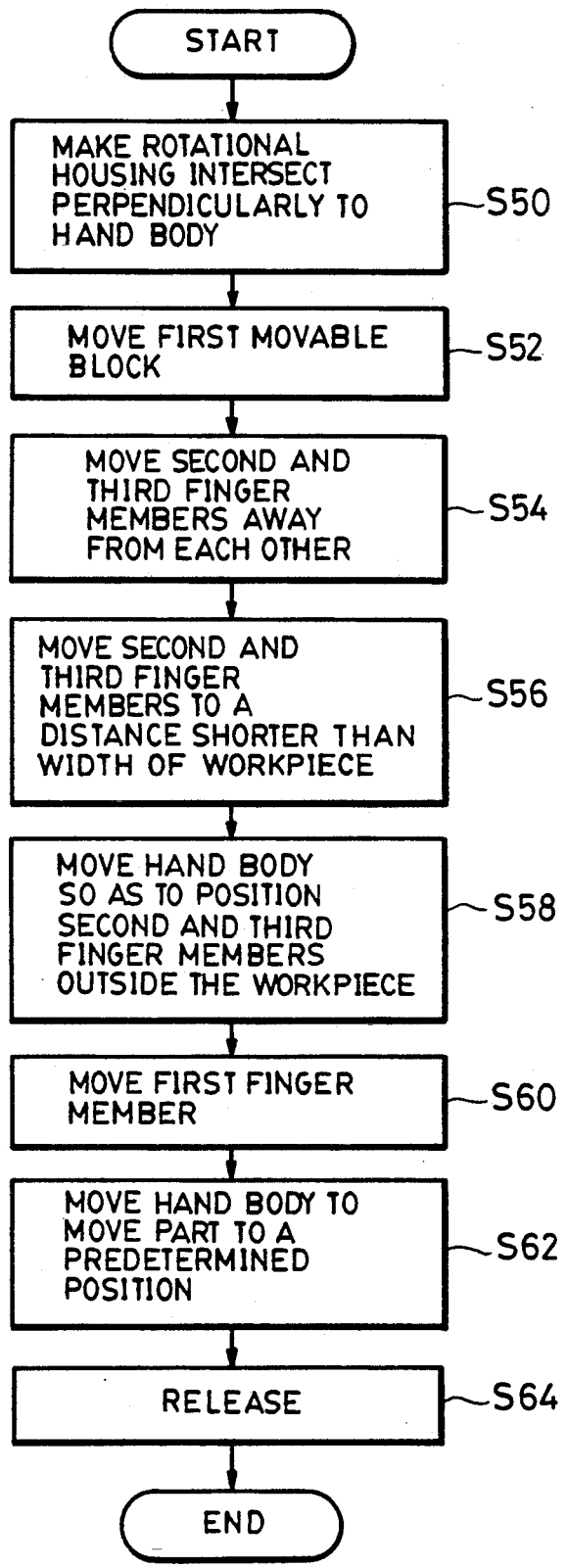
FIG. 7 is a flow chart which illustrates the process of holding the part shown in FIGS. 6A and 6B.

An operation performed by the above-described assembling hand 10 for holding the members $W_1$ and $W_2$ will be described with reference to a flow chart shown in FIG. 7.

First, in step S50, the second drive motor 30 is rotated so that the rotational housing 34 is positioned so as to perpendicularly intersect with the hand body 12. In step S52, the first drive motor 20 is rotated so that the first movable block 24 is moved to the farthest position from supporting block 16. Then, in step S54, the third drive motor 38 is rotated so that the second and the third movable blocks 42 and 44 are shifted so that the two blocks 42 and 44 are positioned farthest from each other. Thus, in steps S50 to 54, the three finger members 26a, 46a and 48a are brought to the wait state.

Then, in step S56, the third drive motor 38 is rotated so that the second and third finger members 46a and 48a are shifted so that the two members 46a and 48a are positioned away from each other by a distance which is shorter than the width (or the diameter of the cylindrical member $W_2$) of the flat member $W_1$. In step S58, the hand body 12 is shifted from the above-described state so that the second and the third finger members 46a and 48a are positioned outside the side surface (outer surface) of the members $W_1$ and $W_2$. Then, in step S60, the first drive motor 20 is rotated so that the first finger member 26a is shifted toward the second and the third finger members 46a and 48a for the purpose of holding the parts $W_1$ and $W_2$ by the three finger members 26a, 46a and 48a.

When the parts $W_1$ and $W_2$ have been held as described above, the hand body 12 is shifted in step S62 so as to convey the held parts $W_1$ and $W_2$ to the predetermined positions at which the parts $W_1$ and $W_2$ are assembled. Then, in step S64, the first and the third drive motors 20 and 38 are rotated with the parts $W_1$ and $W_2$ positioned as described above. As a result, the three finger members 26a, 46a and 48a are moved away from the side surface (outer surface) of each of the parts $W_1$ and $W_2$ for the purpose of releasing them. Thus, the sequential part holding operation is ended.

As described above, according to the assembling hand 10 according to this embodiment, the pair of gears 62 and 64 engaged in the manner which has been previously determined can be fastened to the base plate while maintaining the engagement. Furthermore, the parts $W_1$ and $W_2$ having optional shapes can be held. Therefore, the assembling hand 10 according to the present invention can be used as a multi-purpose assembling hand.

Although the invention has been described in its preferred form with a certain degree of particularly, it is understood that the present disclosure of the preferred form can be changed in the details of construction and the combination and arrangement of parts without departing from the spirit and the scope of the invention as hereinafter claimed.

As described above, the assembling hand according to the present invention comprises the hand body, the first finger member capable of moving along the hand body, the rotational housing rotatably fastened to the hand body and the second and the third finger members capable of moving along the rotational housing in opposite directions to each other. The part holding operation is performed by the three finger members, the rotational position of one part is restricted by the first finger member and the rotational position of the other part is adjusted by the second and the third finger members.

Therefore, according to the present invention, there is provided an assembling hand capable of holding parts of a variety of shapes and assembling gears in a predetermined engagement state.

The structure of another embodiment of a robot hand according to the present invention will be described with reference to the drawings.

Figure 8:
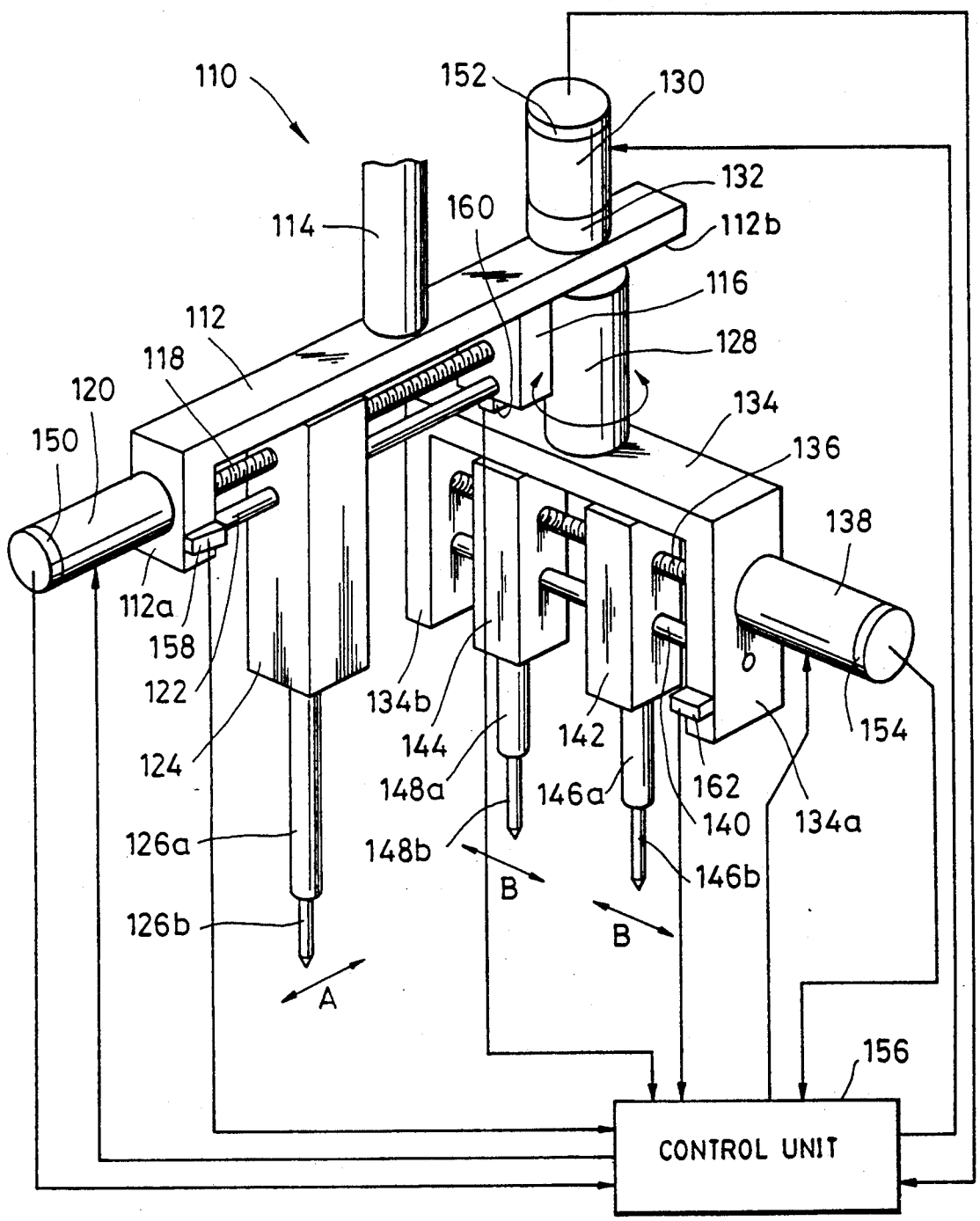
FIG. 8 is a perspective view which illustrates the structure of an embodiment of a robot hand according to the present invention.

FIG. 8 illustrates a robot hand 110 according to this embodiment. The robot hand 110 comprises a hand body 112 substantially L-shaped when viewed from the front portion thereof, with the hand body 112 having a bent member 112a having an end bent downwards. The hand body 112 is detachably connected to the front portion of a robot arm (omitted from illustration) via a connection rod 114 at the central portion o the top surface thereof. A supporting block 116 is secured to the lower surface of the hand body 112 at an inner portion from another end portion 112b of the hand body 112, with the bent member 112a being formed at an opposite end of the hand body 112 from the end portion 112b. A first feeding screw rod 118 extending along first movement locus A defined by the hand body 112 and having a thread on the outer surface thereof is disposed between the supporting block 116 and the bent member 112a in such a manner that it is able to rotate around its central axis. The first feeding screw rod 118 is connected to the drive shaft of a first drive motor 120 mounted on the outer surface of the bent member 112a so that it can be rotated when the first drive motor 120 is rotated.

A first guide shaft 122 is secured between the supporting block 116 and the bent member 112a at a position below the first feeding screw rod 118 and in parallel to the same. That is, the first guide shaft 122 is extended along he first movement locus A. A first movable block 124 is disposed between the supporting block 116 and the bent member 112a in such a manner that it can be reciprocated along the first guide shaft 122 by action of the threads of the first feeding screw rod 118. As a result, the first movable block 124 can be reciprocated along first movable locus A below the hand body 112 in accordance with the rotation of the first drive motor 120.

A first finger member 126a is integrally fastened to the lower surface of the first movable block 124 in such a manner that the first finger member 126a projects downwardly from the lower surface of the first movable block 124. Furthermore, a first fingertip member 126b, having a diameter smaller than that of the first finger member 126a, is fastened to the lower surface of the first finger member 126a in such a manner that the first fingertip member 126b projects further downwardly from the lower surface of the finger member 126a and coaxially therewith. A tapered surface is formed at the front end portion of the first fingertip member 126b so that the first fingertip member 126b has a sharp front end portion. The mechanism for projecting the finger member 126b downwardly will be described later.

A rotational shaft 128, which can be rotated around its vertical axis, is fastened to the lower surface of the hand body 112 at the end portion 112b of the hand body 112. The top end portion of the rotational shaft 128 passes through the hand body 112 so as to be connected to an output shaft of a reduction mechanism 132 connected to a second drive motor 130 mounted on the top surface of the hand body 112. The lower end portion of the rotational shaft 128 is integrally connected to the central portion of the top surface of a rotational housing 134 having a substantially U-shape configuration.

That is, the rotational housing 134 comprises bent members 134a and 134b defining the other limits of second movement locus B, with the bent members 134a and 134b being bent downwards at the two end portions of the rotational housing 134. A second feeding screw rod 136 having a thread on the outer surface thereof is disposed between the two bent members 134a and 134b along the rotational housing 34, that is, along the second movement locus B in such a manner that the second feeding screw rod 136 is able to rotate around its central axis. The thread formed on the second feeding screw rod 136 is laterally sectioned into two pieces at the central portion thereof so as to have opposite thread directions. The second feeding screw rod 136 is connected to the drive shaft of a third drive motor 138 mounted on the outer surface of the bent member 134a so that it can be rotated when the rotation of the third drive motor 138 is started.

A second guide shaft 140 is secured between the two bent members 134a and 134b below the second feeding screw rod 136 in such a manner that the second guide shaft 140 runs parallel to second movement locus B. A second movable block 142 is disposed between the two bent members 134a and 134b in such a manner that the second movable block 142 is engaged to one set of threads of the second feeding screw rod 136 so as to be capable of reciprocating in the second movement locus B direction along the second guide shaft 140. A third movable block 144 is disposed in such a manner that the third movable block 144 is engaged to the other set of the threads of the second feeding screw rod 136 so as to be capable of reciprocating in the second movement locus B direction along the second guide shaft 140. As a result, the second and third movable blocks 142 and 144 are reciprocated so as to move closer and farther from each other along the second guide shaft 140 and below the rotational housing 134 in accordance with the direction of rotation of the third drive motor 138.

Second and a third finger members 146a and 148a are integrally fastened to the respective lower surfaces of the second and the third movable blocks 142 and 144 in such a manner that the second and the third finger members 146a and 148a project downwardly from the lower surface of the second and the third movable blocks 142 and 144. Furthermore, second and a third fingertip members 146b and 148b, having a diameter smaller than that of the second and the third finger members 146a and 148a, are integrally fastened to the lower surfaces of the second and the third finger members 146a and 148a in such a manner that the second and the third fingertip members 146b and 148b project further downwardly from the lower surfaces of the second and the third finger members 146a and 148a and coaxially therewith. A tapered surface is formed at the front end portion of each of the second and the third fingertip members 146b and 148b so that each of the second and the third fingertip members 146b and 148b has a sharp front end portion.

Rotary encoders 150, 152 and 154 are connected to the corresponding drive shafts of the first, second and third drive motors 120, 130 and 138, respectively. As a result, the quantity of rotation of the three drive motors 120, 130 and 138 can be accurately detected by the corresponding rotary encoders 150, 152 and 154. The three rotary encoders 150, 152 and 154 are connected to a control unit 156 which controls the overall operation of the apparatus. The structure and the function of the control unit 156 will be described later.

The first movable block 124 is arranged in such a manner that its original position is defined to be a position farthest from the bent member 112a. Therefore, a first origin-sensor 158 for detecting the origin of the first movable block 124 is provided on the bent member 112a. The first origin-sensor 158 is connected to the control unit 156 so that a first origin-signal is transmitted to the control unit 156 when the first movable block 124 has reached the origin. The control unit 156 receives the first origin-signal so as to again define the origin of the first movable block 124.

On the other hand, the rotational housing 134 is arranged in such a manner that the rotational position, at which point the second movement locus B intersects with the first movement locus A, is defined to be its original point. Therefore, a second origin-sensor 160 for detecting the origin of the rotational housing 134 is provided on the supporting block 116. The second origin-sensor 160 is connected to the control unit 156 so that a second origin-signal is transmitted to the control unit 156 when the rotational housing 134 has reached the origin. The control unit 156 receives the second origin-signal so as to again define the origin of the rotational housing 134.

Furthermore, the second and the third movable blocks 142 and 144 are arranged in such a manner that the origins are defined to be the positions at which the second and the third movable blocks 142 and 144 are positioned farthest away from each other. That is, the positions at which the second and the third movable blocks 142 and 144 are positioned adjacent to the corresponding bent members 134a and 134b. Since the above-described second and the third movable blocks 142 and 144 are moved closer to and farther away from each other in synchronization, it is only necessary to detect the origin of either of the second and the third movable blocks 142 and 144. Specifically, it is only necessary to detect the origin of the second movable block. Therefore, a third origin-sensor 162 for detecting the origin of the second movable block 142 is provided for the bent member 134a. The third origin-sensor 162 is connected to the control unit 156 so that a third origin-signal is transmitted to the control unit 156 when the second movable block 142 has reached the origin. The control unit 156 receives the third origin-signal so as to again define the origin of each of the second and third movable blocks 142 and 144.

The downwardly projecting mechanism 164a of the above-described first fingertip member 126b will be described with reference to FIG. 9. Since the projecting mechanism 164a is arranged similarly to the projecting mechanism for each of the second and the third fingertip members 146b and 148b, the projecting mechanism 164a for the first fingertip member 126b will be described and such description will serve for the second and the third fingertip members 146b and 148b as well.

Figure 9:
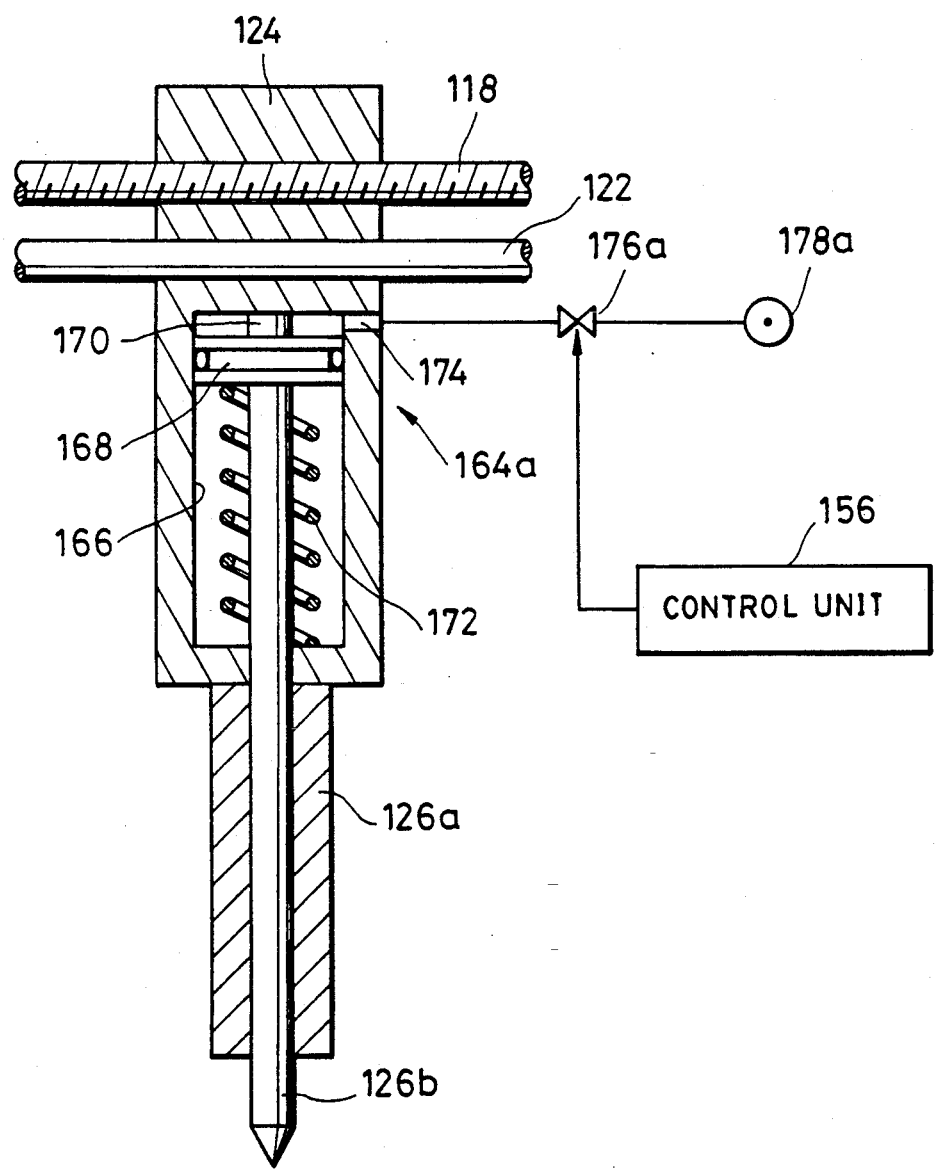
FIG. 9 is a cross sectional view which illustrates the structure of a projecting mechanism provided in a movable block shown in FIG. 8.

The projecting mechanism 164a comprises, as shown in FIG. 9, a cylinder chamber 166 vertically extending inside the first movable block 124. The cylinder chamber 166 accommodates a piston 168 capable of vertically movement. A stopper member 170 is integrally formed on the top surface of the piston 168, while the top end portion of the first fingertip member 126b passing through the first finger member 126a and introduced into the cylinder chamber 166 is connected to the lower surface of the piston 168.

The piston 168 is always urged upwardly by a coil spring 172. The top end portion of the cylinder chamber 166 is connected to a pressurizing mechanism 178a via a communication hole 174 passing through the first movable block 124 and also via a connection valve 176a. The pressurizing mechanism 178a is always operated and is arranged to be closed/opened by the control unit 156.

Since the projection mechanism 164a is structured as described above, the control unit 156 maintains the connection valve 176a in the closed position when it is determined that the downwardly projection of the first fingertip member 126b is unnecessary. As a result, the piston 168 is urged upwardly by the coil spring 172 as is the first fingertip member 126b connected to the piston 168. As a result, the piston 168 is held at the upper waiting position. If it is determined that it is necessary to project the first fingertip member 126b downwardly, the control unit 156 switches the connection valve 176a from the closed position to the open position. As a result, the piston 168 is pushed downwardly against the coil spring 172. Therefore, the first fingertip member 126b is also downwardly projected. When the control unit 156 switches the connection valve 176a from the open position to the closed position, the piston 168 is raised by the urging force of the coil spring 172. As a result, the first fingertip member 126b is returned to the upper waiting position.

According to the above-described structure, the description is only of the projecting mechanism 164a of the first fingertip member 126b. The projecting mechanism for each of the second and the third fingertip members 146b and 148b operates in the same way.

The structure of the control unit 156 will schematically be described with reference to FIG. 10.

Figure 10:
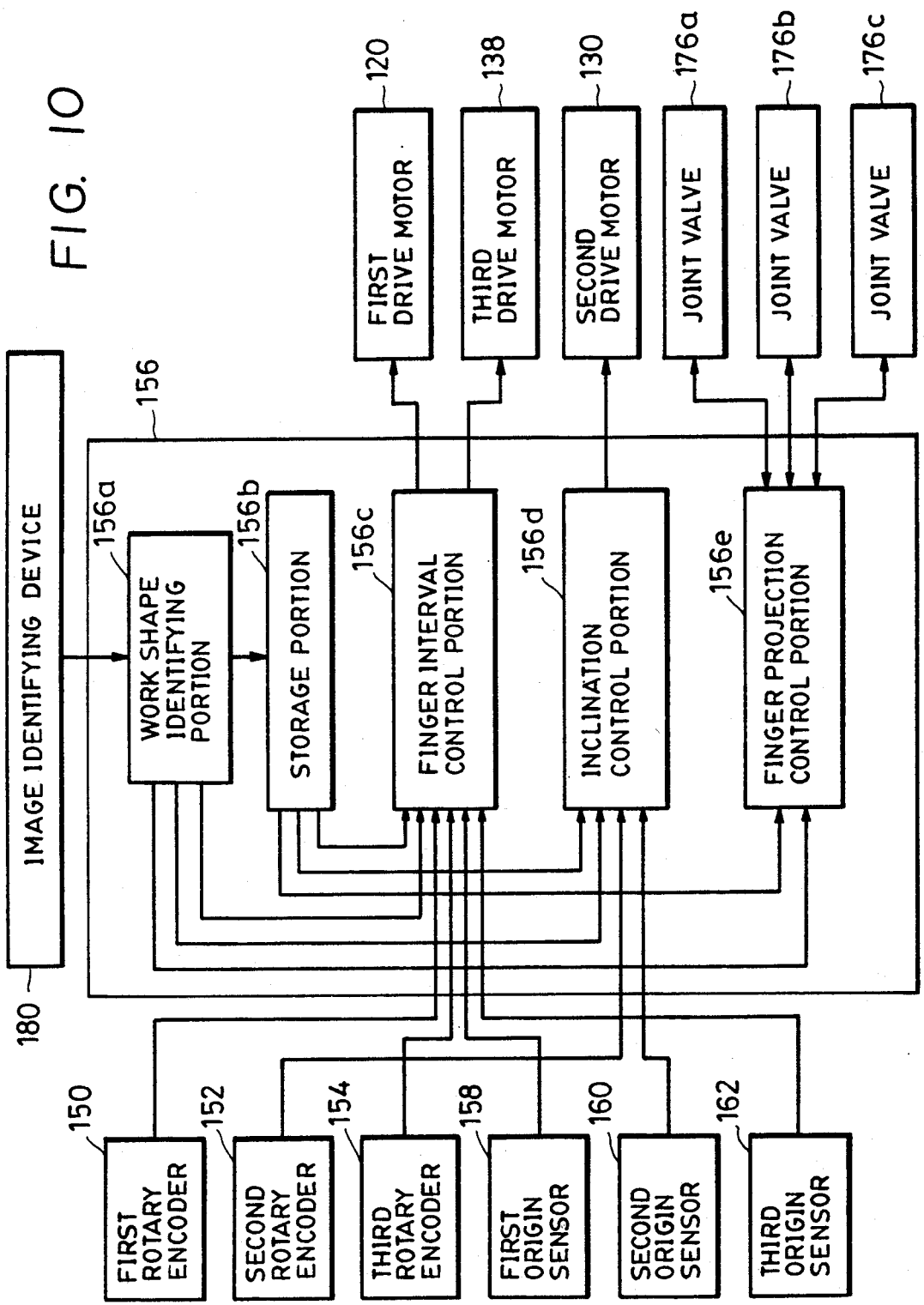
FIG. 10 is a block diagram which illustrates the structure of a control unit shown in FIG. 8.
Figure 11A:
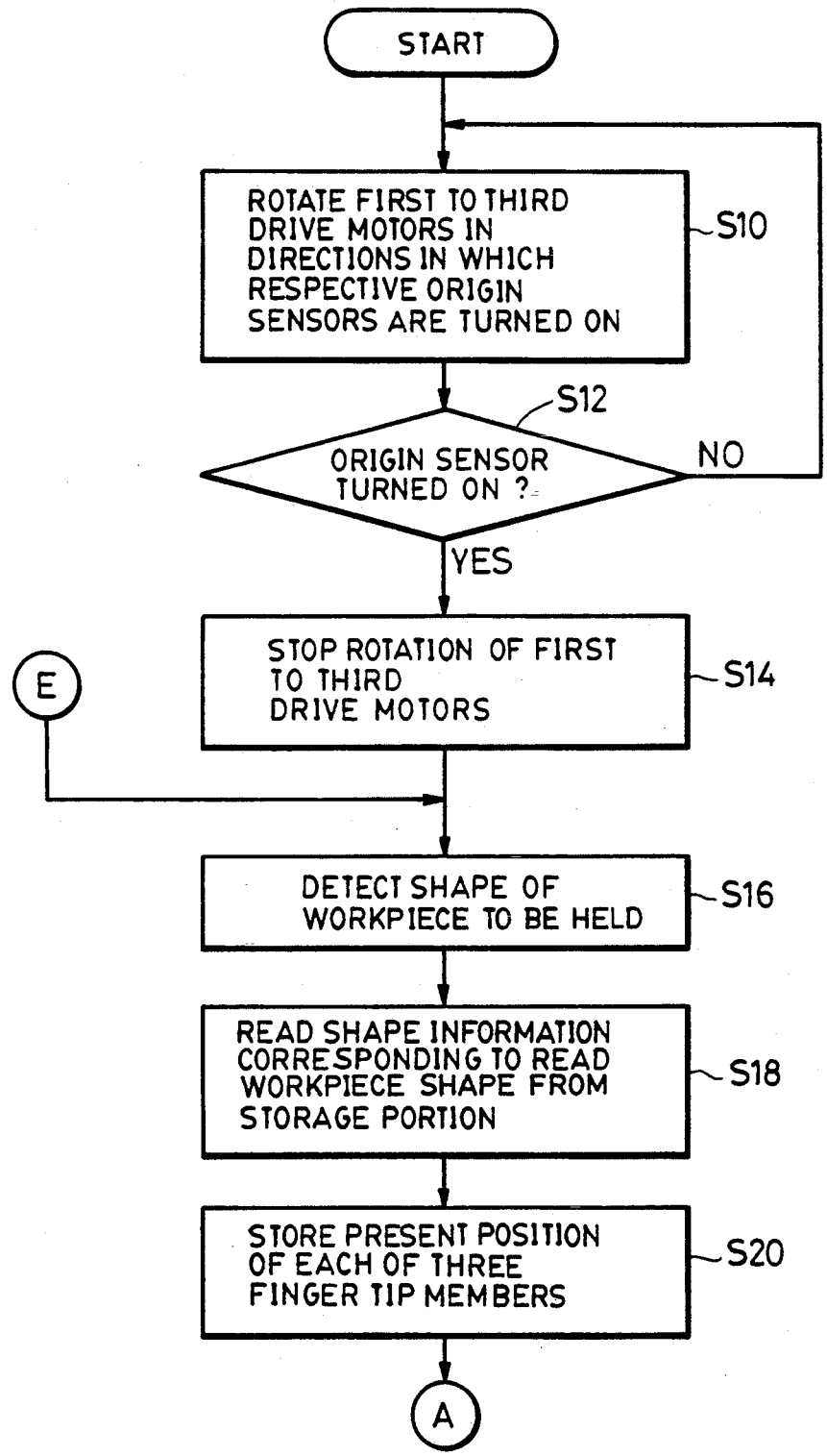
FIG. 11 (A-D) is a flow chart which illustrates the process of control performed by the control unit.
Figure 11:
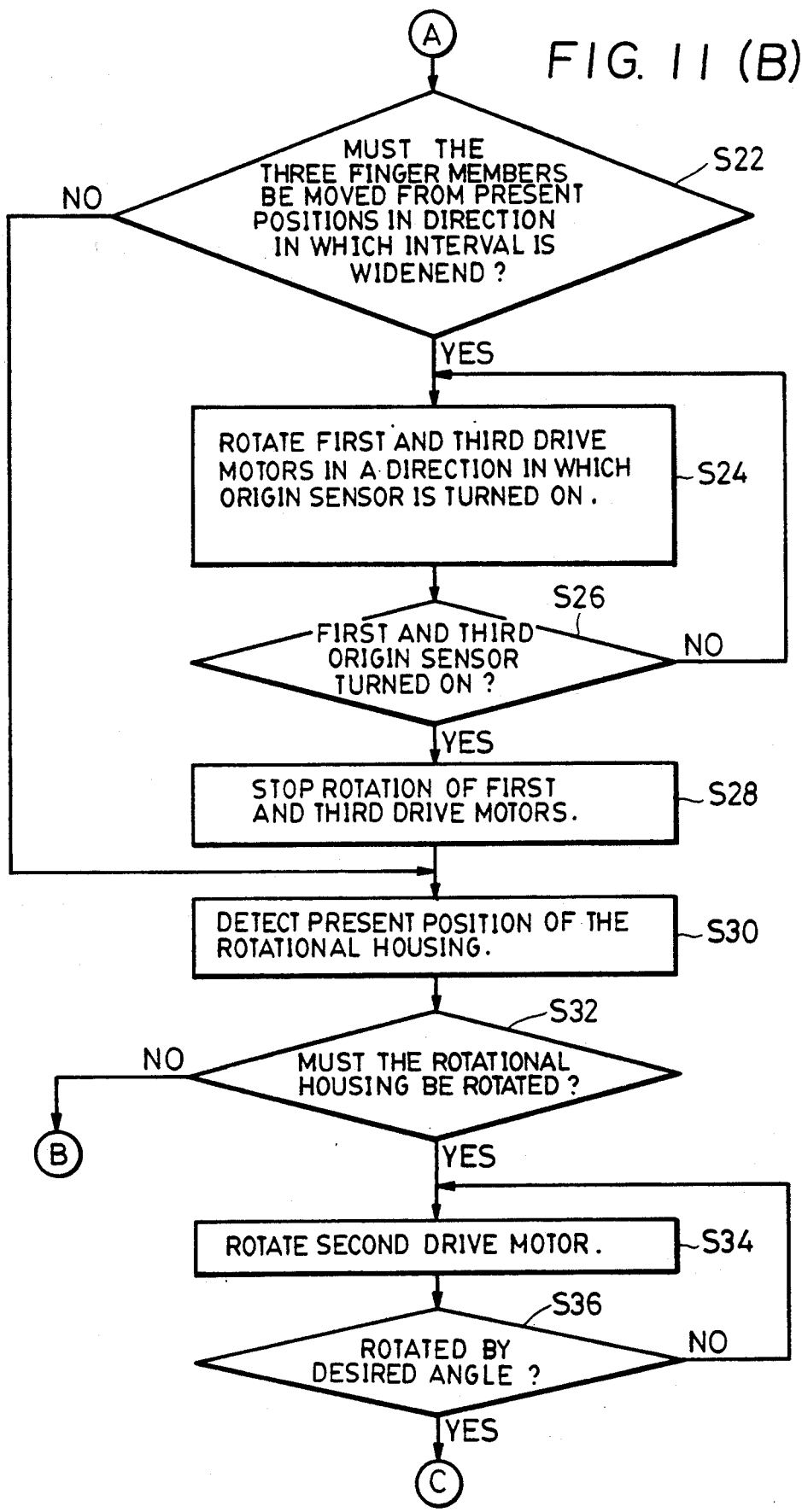
Figure 11:
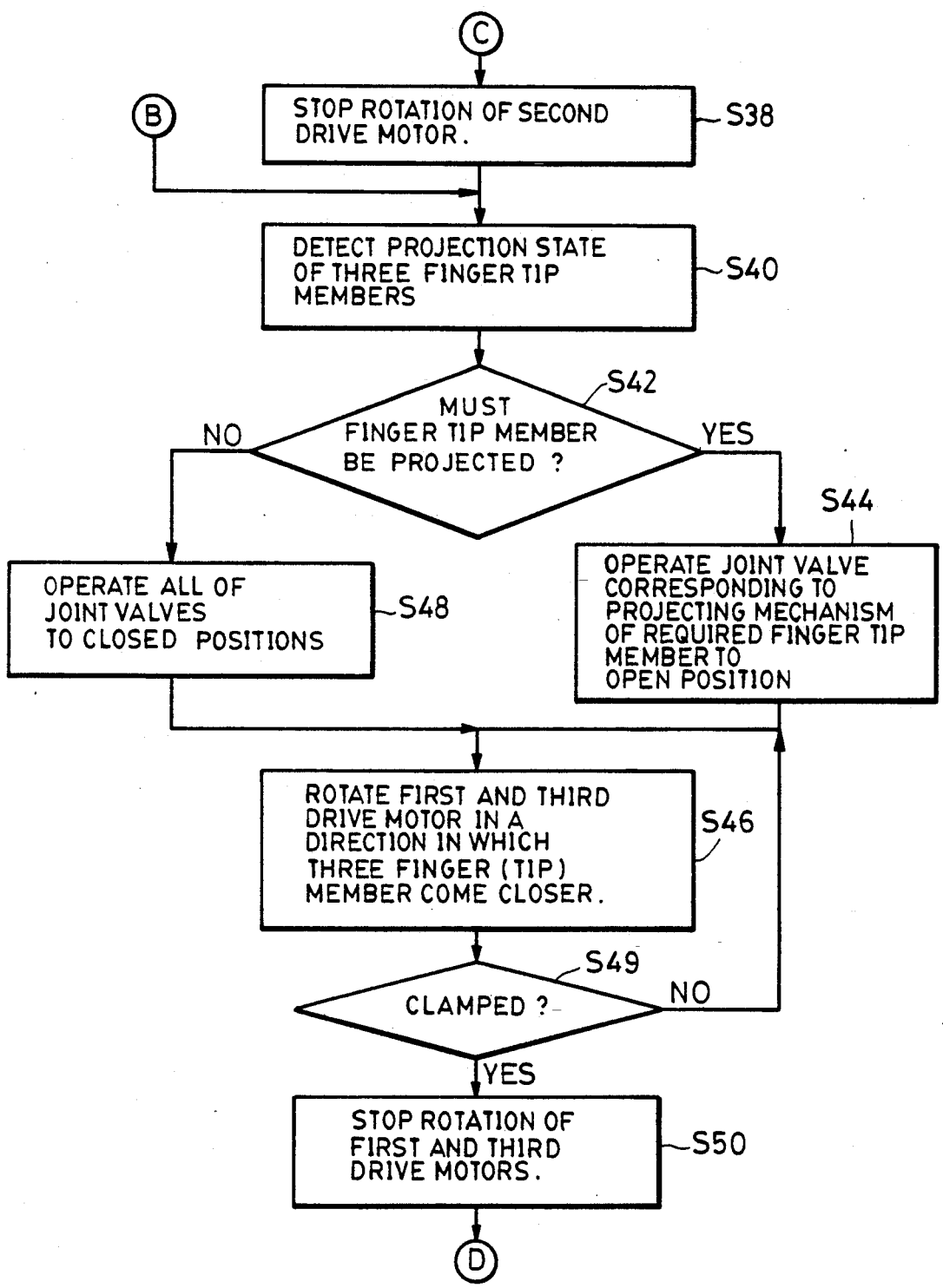
Figure 11:
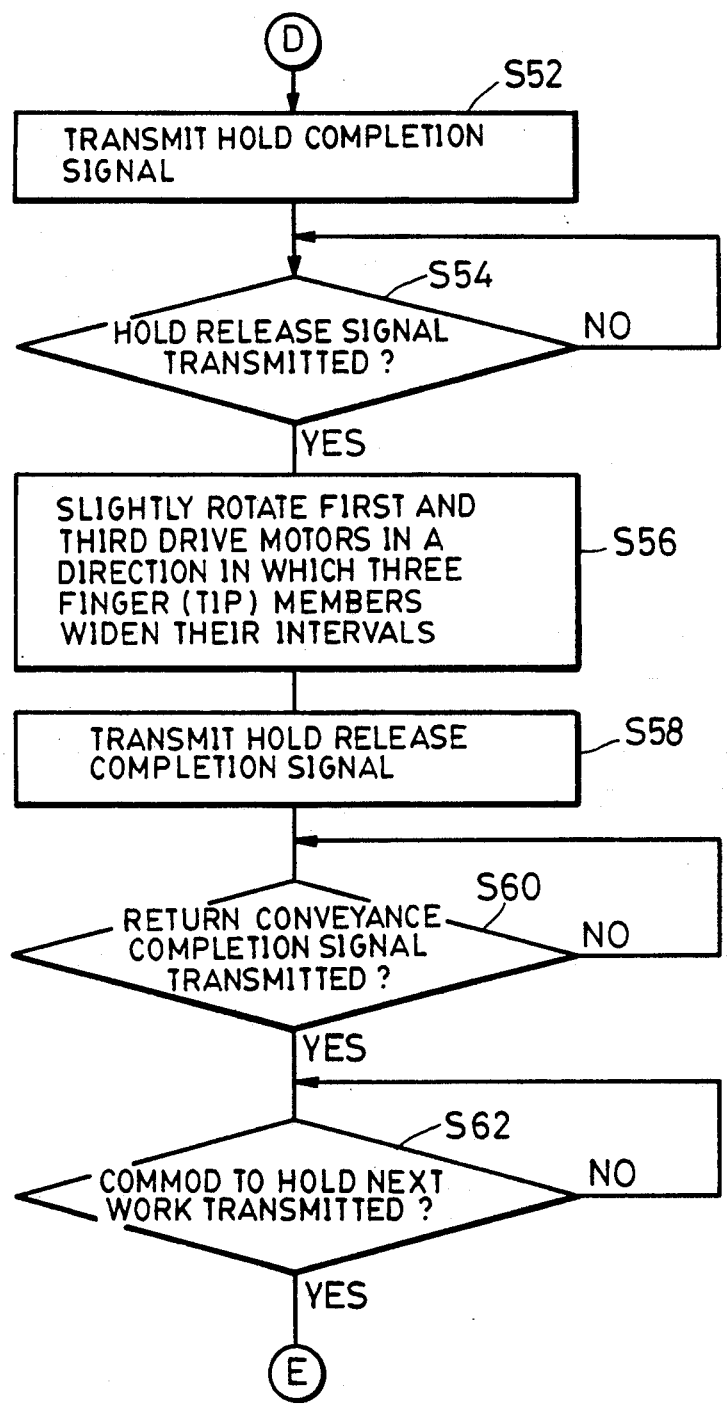

Each of the elements shown in block outline of FIG. 10 is well known per se and its specific type or construction is not critical to carrying out the invention to a disclosure of the best mode for carrying out the invention.

The control unit 156 comprises a workpiece shape identifying portion 156a to which an image identifying apparatus 180 is connected. The image identifying apparatus is capable of imaging a workpiece and identifying an image in accordance with the thus obtained image information so as to identify the shape of the workpiece.

Furthermore, the control unit 156 comprises a storage portion 156b in which specific shape information for each workpiece is stored. The information is exemplified by information about the external dimension of the subject workpiece, information about the positional relationship between the surface to which the first fingertip member 26b is brought into contact at the time of holding the workpiece and the surface to which the second and the third fingertip members 146b and 148b are brought into contact, and information about the height from the surface on which the workpiece is placed to the most suitable contact position for each of the three fingertip members 126b, 146b and 148b.

The control unit 156 comprises a fingertip interval control portion 156c for changing the positional relationship among the three finger members 126a, 146a and 148a by controlling the rotation of each of the drive motors 120 and 138. The fingertip interval control portion 156c obtains shape information of the workpiece from the workpiece shape identifying portion 156a and the storage portion 156b. Furthermore, the fingertip interval control portion 156c detects the present position of each of the three finger members 126a, 146a and 148a from a detection signal supplied from the rotary encoders 150 and 154 and the origin sensors 158 and 162.

The control unit 156 comprises an inclination angle control portion 156d for changing the angle made by the above-described first and the second movement loci A and B by controlling the rotation of the second drive motor 130. The inclination angle control portion 156d obtains the shape information about the workpiece from the workpiece shape identifying portion 156a and the storage portion 156b. Furthermore, the inclination angle control portion 156d detects the present rotational position of the rotational housing 134 from a detection signal from each of the second rotary encoder 152 and the second origin-sensor 160.

Furthermore, the control unit 156 comprises a fingertip projection control portion 156e for controlling the operation of the projection mechanism 164 by controlling the operation of the connection valve 176. The fingertip projection control portion 156e obtains the shape information about the workpiece from the workpiece shape identifying portion 156a and the storage portion 156b.

The control of the workpiece holding operation performed by the control unit 156 will be described below.

First, in step S10, the three drive motors 120, 130 and 138 are rotated in directions in which the corresponding origin sensors 158, 160 and 162 are turned on. In step S12, the corresponding original sensors 158, 160 and 162 are turned on so that the corresponding motors 120, 130 and 138 are respectively stopped in step S14. As a result, the origin position of each of the three finger members 126a, 146a and 148a is confirmed in the fingertip interval control portion 156c in the control unit 156 and the present position of each of the same can be detected as the absolute value from the origin.

The above-described process from step S10 to S14 need only be performed once at the start of the operation and the necessity of repeating the processes when the subject workpiece is held can be eliminated.

Then, in step S16, the shape identifying portion 156a is started so that the shape of the workpiece is identified from image information supplied from the image identifying apparatus 180. Then, in step S18, the shape information for the corresponding workpiece is read from the storage portion 156b in accordance with the workpiece shape identified in step S16.

In step S20, the fingertip interval control portion 156c is started so that the present position of each of the three finger members 126a, 146a and 148a is read. In step S22, it is determined whether or not the interval among three finger members 126a, 146a and 148a must be widened from the present positions for the purpose of holding the workpiece in accordance with information about the present positions of the three finger members 126a, 146a and 148a read in step S20 and the shape information about the workpiece to be held and read in step S18.

If it is determined that it must be widened, that is, if it is determined that the workpiece cannot be held since the three finger members 126a, 146a and 148a are positioned inside the outer surface of the workpiece, the flow advances to step S24 in which the first and third drive motors 120 and 138 are respectively rotated in order to shift the three finger members 126a, 146a and 148a from the present positions in directions in which the corresponding origin sensors 158 and 162 are turned on. When it has been detected in step S26 that the first and third origin-sensors 158 and 162 have been turned on, the rotation of each of the first and the third drive motors 120 and 138 is stopped in step S28. Then, the flow advances to step S30.

If it has been determined in step S22 that the interval must not be widened, that is, the subject workpiece can be held since the three finger members 126a, 146a and 148a are respectively positioned outside the outer surface of the workpiece to be held, the flow skips over steps S24 to S28. Then, step S30 is immediately performed.

In step S30, the inclination angle control portion 156d is started so that the present rotational position of the rotational housing 134 is read. In step S32, it is determined whether or not the rotational housing 134 must be rotated from the present rotational position for the purpose of holding the workpiece in accordance with the present rotational position of the rotational housing 134 read in step S30 and the shape information of the workpiece read in step S18.

If it is determined that the same must be rotated, that is, if it is determined that the rotational housing 134 must be rotated from the present rotational position for the purpose of holding the workpiece, the flow advances to step S34 in which the second drive motor 130 is rotated so as to rotate the rotational housing 134. If it has been detected that the rotational housing 134 had been rotated by the necessary angular degree, the flow advances to step S38 in which the rotation of the second drive motor 130 is stopped, and the flow advances to step S40.

If it has been determined that the same must not be rotated in step S32, that is, if it has been determined that the rotational housing 134 must not be rotated from the present position, the flow skips over the above-described steps S34 to S38, and step S40 is immediately performed.

In step S40, the fingertip projection control portion 156e is started so that the state of projection of each of the three fingertip members 126b, 146b and 148b is read. In step S42, the necessity of projecting fingertip members 126b, 146b and 148b for holding the workpiece is determined in accordance with the state of the projection of each of the three fingertip members 126b, 146b and 148*b* read in step S40 and the shape information about the workpiece to be held.

If it has been determined in step S42 that projection is necessary, that is, it is necessary for any of the three fingertip members 126*b*, 146*b* and 148*b* to be projected for the purpose of holding the workpiece, the flow advances to step S44 in which the corresponding connection valves for the projecting mechanism of the fingertip members 126*b*, 146*b* and/or 148*b*, which is the fingertip member determined to be projected, is opened, and the flow advances to step S46.

If it has been determined that the projection of the fingertip members 126*b*, 146*b* and 148*b* is not necessary, the flow advances to step S48 in which all of the connection valves 176*a*, 176*b* and 176*c* are closed, and then the flow advances to step S46.

In step S46, the finger interval control portion 156*c* is again started so that the first and third drive motors 120 and 138 are rotated in directions in which the intervals between the three finger tip members 126*b*, 146*b*, and thus between the three finger members 126*a*, 146*a* and 148*a*, are narrowed. In step S49, if it is detected that the workpiece has been clamped by the three fingertip members 126*b*, 146*b* and 148*b*, that is, the three finger members 126*a*, 146*a* and 148*a*, rotation of the first and the third drive motors 120 and 138 are stopped in step S50. The above-described completion of clamping is detected by observing the electric current passing through the first and third drive motors 120 and 138 or by using a contact sensor.

Then, in step S52, a hold completion signal is transmitted. In response to that hold completion signal, a robot (omitted from illustration) conveys the robot hand 110 which is holding the workpiece to a predetermined mounting position in accordance with the control sequence provided for the robot. When the robot hand 110 has been conveyed to the predetermined mounting position, the control unit for the robot transmits a releasing signal to the control unit 156. That is, the control unit 156 waits for the output of the release signal in step S54 after the process in step S52 has been performed. If the control unit 156 detects the release signal, it controls, in step S56, the rotation of the first and third drive motors 120 and 138 in a direction in which the intervals among three fingertip members 126*b*, 146*b* and 148*b*, that is, among the three finger members 126*a*, 146*a* and 148*a* are widened to a certain degree. Then, the control unit 156 transmits a release completion signal in step S58. In response to the release completion signal, the control unit for the robot conveys the robot hand 110 so as to return it to its original position at which the workpiece is held. After the above-described conveyance has been completed, the control unit for the robot transmits a return conveyance completion signal to the control unit 156.

That is, the control unit 156 waits for the transmitting of the return conveyance completion signal in step S60 after the operation in step S58 has been performed. When the control unit 156 detects the return conveyance completion signal, it waits for the command to hold the next workpiece in step S62. Then, the flow returns to the step S16 and the operation from step S16 is performed.

Figure 12:
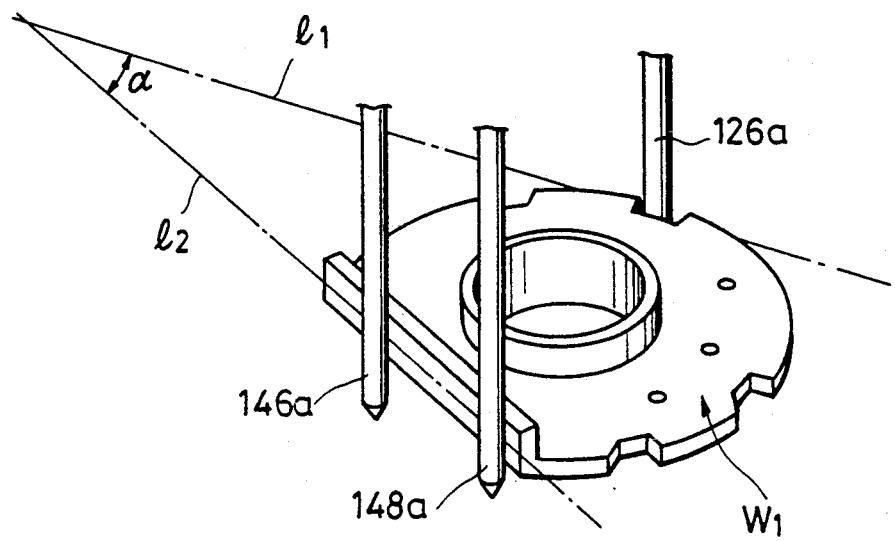
FIG. 12 is a perspective view which illustrates an example of the shape of a workpiece which can be held by the robot hand according to the present invention.
Figure 13:
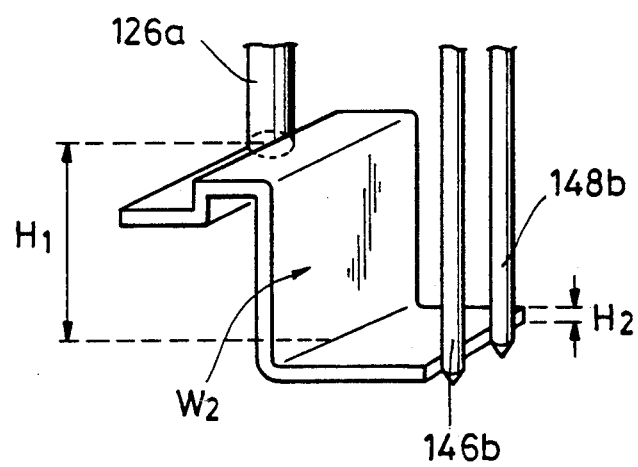
FIG. 13 is a perspective view which illustrates another example of the workpiece which can be held by the robot hand according to the present invention.

As described above, since the control unit performs the predetermined control sequence, the workpiece $W_1$ having a complicated shape as shown in FIG. 12 and the workpiece $W_2$ having a stepped portion thereof as shown in FIG. 13 can be securely held. The workpiece $W_1$ shown in FIG. 12 is arranged in such a manner that tangential line $l_1$ at a point at which the first finger member 126*a* is brought into contact and tangential line $l_2$ connecting the second and the third finger members 146*a* and 148*a* make a predetermined acute angle $\alpha$. When a workpiece such as the workpiece $W_1$ is held, the attitude of the three finger members 126*a*, 146*a* and 148*a* are made the most suitable by rotating the rotational housing 134 so that the workpiece $W_1$ can be securely held.

The workpiece $W_2$ shown in FIG. 13 is arranged in such a manner that its shape is made considerably different at the two holding positions corresponding to the heights $H_1$ and $H_2$. In order to hold the workpiece $W_2$ arranged as described above, the first finger member 126*a* is brought into contact with one of the holding positions, while the second and third fingertip members 146*b* and 148*b* projecting over the second and the third finger members 146*a* and 148*a* are brought into contact with the other holding position. As a result, the workpiece $W_2$ can be securely held.

As described above, the robot for holding a workpiece according to the present invention comprises a hand body, a first finger member fastened to the hand body and capable of moving on a first movement locus, first drive means for moving the first finger member along the first movement locus, second and a third finger members fastened to the hand body and capable of moving along a second movement locus, second drive means for moving the second and third finger members along the second movement locus so as to move them closer or farther from each other and angle changing means for changing the angle made by the first and second movement loci.

A robot hand according to the present invention comprises identifying means for identifying the shape of a workpiece, storage means for storing information about the angle made by the first and the second movement loci and control means for reading angle information from the storage means in accordance with the shape information supplied from the identifying means so as to control the angle changing means in accordance with the read angle information.

A robot hand according to the present invention further comprises identifying means for identifying the shape of the workpiece and control means for controlling the quantity of operation of the first and the second drive means.

A robot hand for holding a workpiece according to the present invention comprises three finger members, drive means for changing the relative distances among the three finger members and a pin member which can be projected over each of the finger members.

A method of holding a workpiece by a robot hand according to the present invention comprises the steps moving a first finger member of three finger members along a first movement locus; moving second and third finger members along the second movement locus so as to adjust the distance between the second and the third finger members; and changing the angle made by the first and the second movement loci so that the workpiece is held by changing the distance from the first finger member to the second and third finger members.

A method of holding a workpiece by a robot hand according to the present invention comprises the steps projecting pin member from each of the corresponding finger members so as to bring each of the pin member into contact with the outer surface of a workpiece to be held; changing the relative distances between the three finger members whereby the workpiece is held by changing the distance between the first finger member and the second and third finger members.

Therefore, a robot hand and a holding method capable of securely holding a workpiece of an optional shape having an inclined surface and an angle member can be provided according to the present invention.

According to the present invention, there is provided a robot hand and a holding method capable of securely holding a workpiece having a complicated shape such as an L-shape in addition to a simple shaped workpiece such as a flat plate or a rectangular body.

According to the present invention, there is provided a robot hand and a holding method capable of securely holding a workpiece by realizing the most suitable configuration of the three finger members corresponding to the shape of the workpiece to be held.

Although the invention has been described in its preferred form with a certain degree of particularly, it is understood that the present disclosure of the preferred form can be changed in the details of construction and the combination and arrangement of parts without departing from the spirit and the scope of the invention as hereinafter claimed.

What is claimed is:

1. A robot hand for handling a workpiece, comprising:
    first finger means having a first finger and reciprocating along a first axis;
    a hand body for supporting and moving said first finger means axially along the first axis;
    second finger means having a second finger and a third finger reciprocating along a second axis, with said second and third fingers reciprocating in opposite directions along the second axis and defining a first interval therebetween, wherein each of said first, second and third fingers include a fingertip member and means for projecting said fingertip member axially from each respective finger;
    a fingertip projection control means for controlling the operation of each of said fingertip members;
    a rotational housing for supporting and moving said second finger means axially along the second axis;
    image identifying means for identifying an image of the workpiece;
    finger interval control means for controlling the first interval between said second and third fingers and for controlling a second interval between said first finger and said second finger means in accordance with image information supplied from said image identifying means; and
    angle control means for rotating said rotational housing relative to said hand body to control an angle defined by the first and second axes.

2. A robot hand according to claim 1, further comprising third means for distinguishing which of said three fingertip members is projected in accordance with information supplied from said image identifying means, said fingertip projection control means controlling projection of each of said fingertip members in accordance with the result of said third distinguishing means.

3. A robot hand for handling a workpiece, comprising:
    first finger means having a first finger and reciprocating along a first axis;
    a hand body for supporting and moving said first finger means axially along the first axis;
    second finger means having a second finger and a third finger reciprocating along a second axis, with said second and third fingers reciprocating in opposite directions along the second axis and defining a first interval therebetween;
    a rotational housing for supporting and moving said second finger means axially along the second axis;
    image identifying means for identifying an image of the workpiece;
    finger interval control means for controlling the first interval between said second and third fingers and for controlling a second interval between said first finger and said second finger means in accordance with image information supplied from said image identifying means;
    angle control means for rotating said rotational housing relative to said hand body to control an angle defined by the first and second axes;
    finger position detecting means for detecting the position of each said finger on the first or second axis, said finger interval control means controlling the first and second intervals between said fingers in accordance with image information supplied from said image identifying means and information supplied from said finger position detecting means; and
    rotational position detecting means for detecting the rotational position of said hand body with respect to said rotational housing, said angle control means controlling the angle between the first and second axes in accordance with the information supplied from said rotational position detecting means and said image identifying means.

4. A robot hand according to claim 3, further comprising:
    first means for distinguishing whether the first and second intervals should be adjusted in accordance with information supplied from said finger position detecting means and said image identifying means, said finger interval control means controlling the first and second intervals based on signals supplied from said first distinguishing means; and
    second means for distinguishing whether said rotational housing should be rotated in accordance with information supplied from said rotational position detection means and said image identifying means, said rotational angle control means controlling the rotational angle between the first and second axes in accordance with the result of said second distinguishing means.

5. A robot hand according to claim 4, further comprising storage means for storing shape information of the workpiece identified by said image identifying means, said finger interval control means controlling the first and second intervals and said angle control means controlling the angle between the first and second axes in accordance with the shape information stored by said storage means.

6. A robot hand for handling a workpiece, comprising:
    first finger means having a first finger and reciprocating along a first axis;
    a hand body for supporting and moving said first finger means axially along the first axis;
    second finger means having a second finger and a third finger reciprocating along a second axis, with said second and third fingers reciprocating in opposite directions along the second axis and defining a first interval therebetween, wherein each of said first, second and third fingers include a fingertip member and means for projecting said fingertip member axially from each respective finger;

fingertip projection control means for controlling the operation of each of aid fingertip members;

a rotational housing for supporting and moving said second finger means axially along the second axis;

storage means for storing shape information of the workpiece;

finger interval control means for controlling the first interval between said second and third fingers and a second interval between said first finger and said second finger means in accordance with image information supplied from said storage means; and angle control means for rotating said rotational housing relative to said hand body to control an angle defined by the first and second axes in accordance with information supplied from said storage means.

* * * * *

UNITED STATES PATENT AND TRADEMARK OFFICE
CERTIFICATE OF CORRECTION

PATENT NO. : 5,161,847

DATED : November 10, 1992

INVENTOR(S) : Takeshi Yakou

It is certified that error appears in the above-identified patent and that said Letters Patent is hereby corrected as shown below:

COLUMN 1:

Line 2, "ROBOT HANDcl BACKGROUND" should read --ROBOT HAND ¶ BACKGROUND--.

Line 21, "No. 61-197,091" should be --61-197091--

Line 29, "No. 61-1979091," should read --No. 61-197091,--.

COLUMN 6:

Line 29, "4" should read --64--.

COLUMN 8:

Line 6, "62. 0 As" should read --62. ¶ As--.
Line 35, "54" should read --S54--.

COLUMN 10:

Line 31, "34," should read --134,--.

UNITED STATES PATENT AND TRADEMARK OFFICE
CERTIFICATE OF CORRECTION

PATENT NO. : 5,161,847

DATED : November 10, 1992

INVENTOR(S) : Takeshi Yakou

It is certified that error appears in the above-identified patent and that said Letters Patent is hereby corrected as shown below:

COLUMN 19:

Line 6, "aid" should read --said--.

Signed and Sealed this

Twenty-third Day of August, 1994

Attest:

BRUCE LEHMAN

Attesting Officer

Commissioner of Patents and Trademarks